Dec. 16, 1969 M. J. H. STAAR 3,484,111

RECORD PLAYERS

Filed Sept. 1, 1966 6 Sheets-Sheet 1

Dec. 16, 1969 M. J. H. STAAR 3,484,111

RECORD PLAYERS

Filed Sept. 1, 1966 6 Sheets-Sheet 3

United States Patent Office 3,484,111

Patented Dec. 16, 1969

3,484,111

RECORD PLAYERS

Marcel Jules Helene Staar, 479 Avenue Louise,
Brussels 5, Belgium

Filed Sept. 1, 1966, Ser. No. 576,619
Claims priority, application Belgium, Sept. 3, 1965, 669,161
Int. Cl. G11b *3/38, 25/04*
U.S. Cl. 274—9 14 Claims

ABSTRACT OF THE DISCLOSURE

A record player in which a record is received and supported in a stationary centered position and a pick-up engages in the grooves of the record and is mounted for free slidable movement on a guide which is rotated about an axis coextensive with the center of the record such that the pick-up travels along the guide radially of the record by reason of its engagement in the record grooves and the rotation of the guide.

This invention relates to record players and other similar instruments and has as its object to provide a new design satisfying various objectives and furnishing important advantages, inter alia:

(a) Reduction of the inertia of the rotating parts, mainly by the fact that the record occupies a stationary position.

(b) The record player can operate in any position.

(c) The cartridge is always perpendicular to the groove.

(d) Information borne by the record is always visible, more particularly any information or pictures at the periphery.

To this end, the record player according to the invention is characterized in that it is so designed that the record to be played remains permanently stationary during playing and in that the pick-up slides on a rotating guide so as to move radially with respect to the center of the record.

In a practical embodiment of the invention, the entire mechanism is mounted in a casing formed with a slot through which the record to be played is introduced, and at the end of the introduction movement of the record the latter acts on a lever which controls centering of the record and holds it against one of the faces of the casing and for centering purposes the pick-up is released so that can come into contact with the record for playing.

At the end of the playing of the record the pick-up acts on the release mechanism which raises the pick-up, releases the record and pushes it out of the casing.

A phonograph guide is rotatable about a fixed shaft inside which a spindle or rod is slidable, the said spindle or rod bearing a record centering stud at the bottom and having at the top an element, e.g., a grooved pulley in conjunction with a lever controlled by the release lever while a sleeve is slidable and pivotable on the phonograph guide and bears a pick-up mechanically connected to a motor and to an amplifier.

Other features of the invention will be apparent from the description of one detailed exemplified embodiment illustrated in the appended drawing, wherein.

Figure 1:
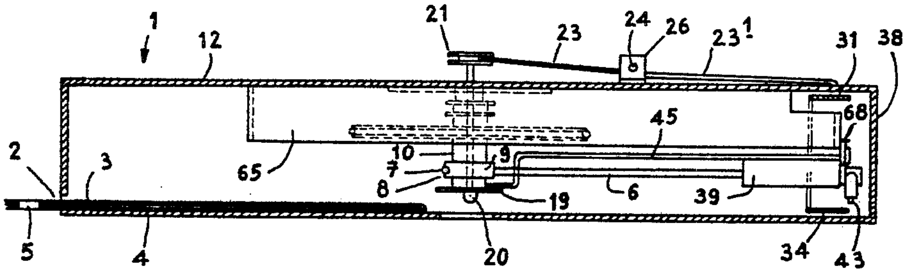
FIG. 1 is an elevation view of the record player in section.

Referring to FIG. 1 of the drawing, reference 1 denotes the record player frame or casing, one of the sides of which has at the bottom a slot 2 for the introduction of the record 3, which has a center hole 5 and which, when introduced, moves over the top surface of the base 4.

An important feature is that the record 3 does not turn during operation.

Figure 3:
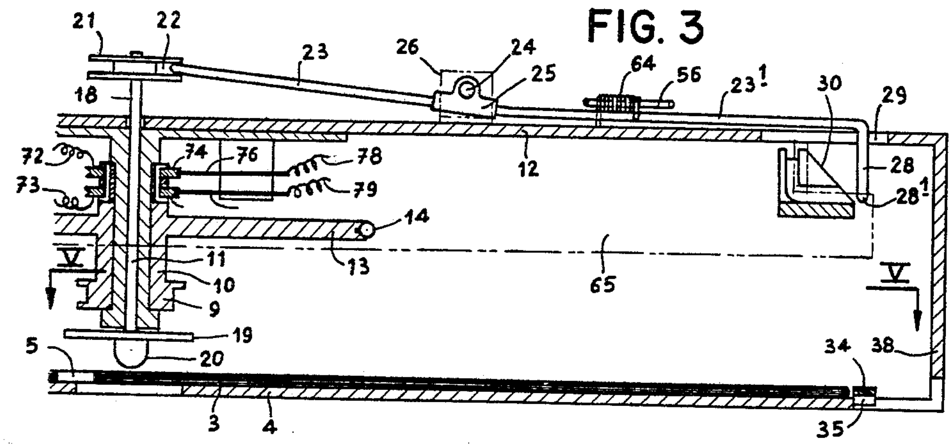
FIG. 3 is a section on the line III—III in FIG. 4.

Reference 6 denotes a phonograph guide formed by a rod of a diameter of approximately 3 mm. which extends in such a way that the point of the stylus moves radially with respect to the record, the said guide being bent at a right angle at 7 near the center for securing the guide in a groove 8 of a plate 9 secured to a sleeve 10 (FIG. 3) rotatable about a hollow shaft 11 secured to the top wall 12 of the casing 1.

A grooved pulley 13 is secured to the sleeve 10 and is driven by a belt 14 via a gearwheel 15 secured to the shaft 16 of a motor 17.

A vertical rod 18 is slidable in the hollow shaft 11 and its bottom portion is provided with a plate 19 bearing a stud 20 for centering and vertical locking of the record 3.

Figure 4:
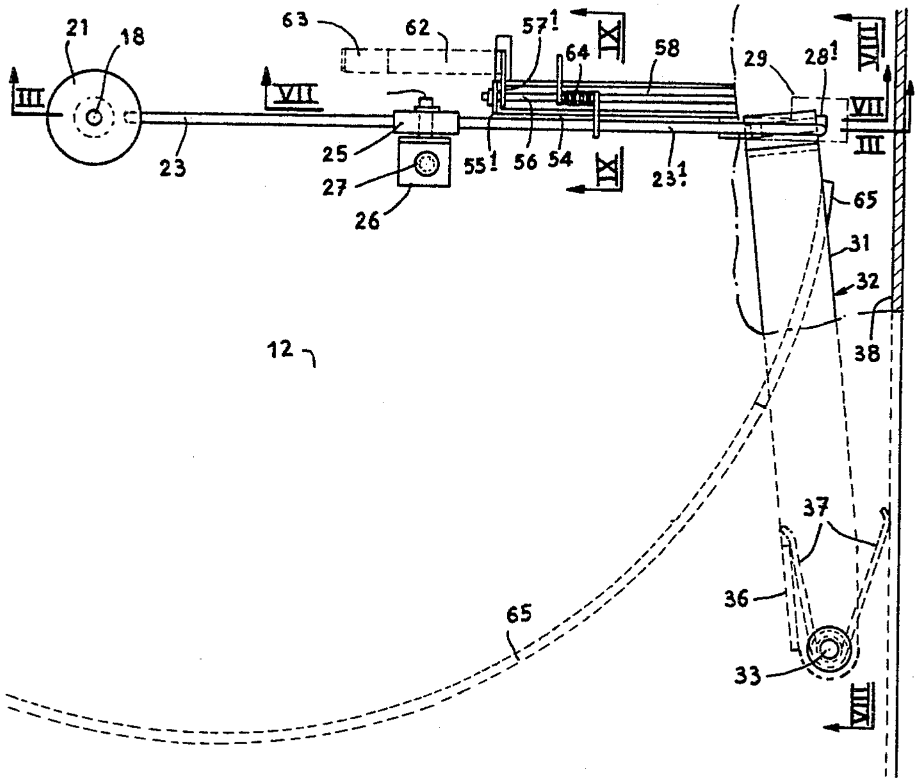
FIG. 4 is a partial plan view of the record player.

At the top, the rod 18 bears a pulley 21 with a groove 22 in which the end of a lever 23 engages, said lever being pivotable about a pivot 24 extending through a sleeve 25 secured to the lever 23. Spindle 24 is secured to a bracket 26 which, for example, is secured by a rivet 27 (FIG. 4) to the top surface 12 of casing 1.

Figure 8:
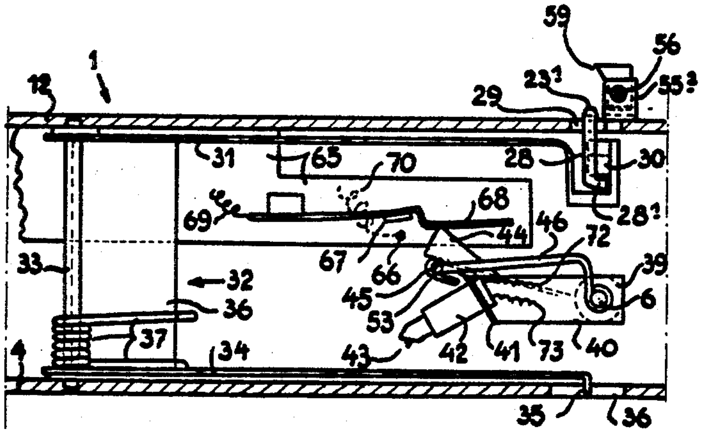
FIGS. 8 and 9 are vertical sections respectively on the lines VIII—VIII and IX—IX in FIG. 4.
Figure 9:
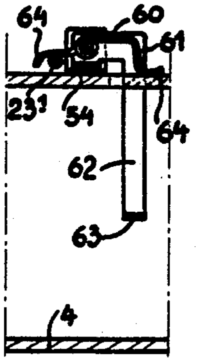

At its outer end, lever $\mathbf{23^1}$ is bent down to form an arm 28 engaging through a slot 29 in the casing 1 and terminating in a nose $\mathbf{28^1}$ (FIG. 8) to co-operate with an inclined surface 30 secured to the top arm 31 of a lever 32 (FIG. 4) pivotable about a vertical spindle 33 secured to the top wall 12 and to the bottom wall 4 of the casing 1. Lever 32 has a bottom arm 34 terminating in a slightly bent portion 35 adapted to engage a notch 36 in the base 4 of the casing (FIG. 8).

Figure 5:
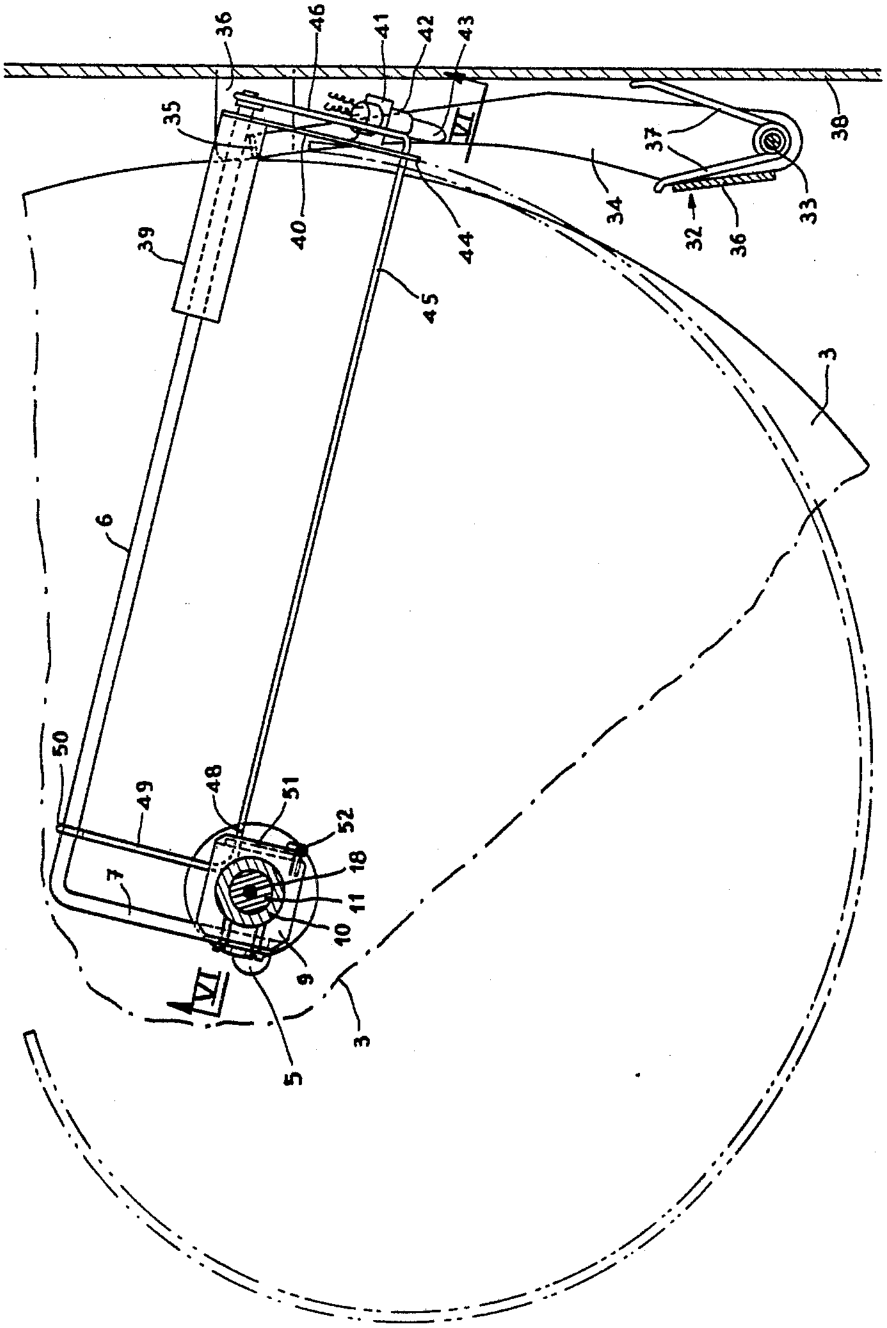
FIG. 5 is a section on the line V—V in FIG. 3.

On the same side as the spindle 33 between the arms 31 and 34 of lever 32 is a strut 36 which connects them and a spring 37 is coiled around the spindle 33, one arm of the spring bearing on the strut 36 and thus tending to hold the lever 32 away from the wall 38 of the casing 1 (FIG. 5).

A sleeve 39 is mounted slidably and pivotally on arm 6 and its outer end bears a lug 40 having a bent portion 41 to which the cartridge 42 bearing the stylus 43 is secured.

Figure 6:
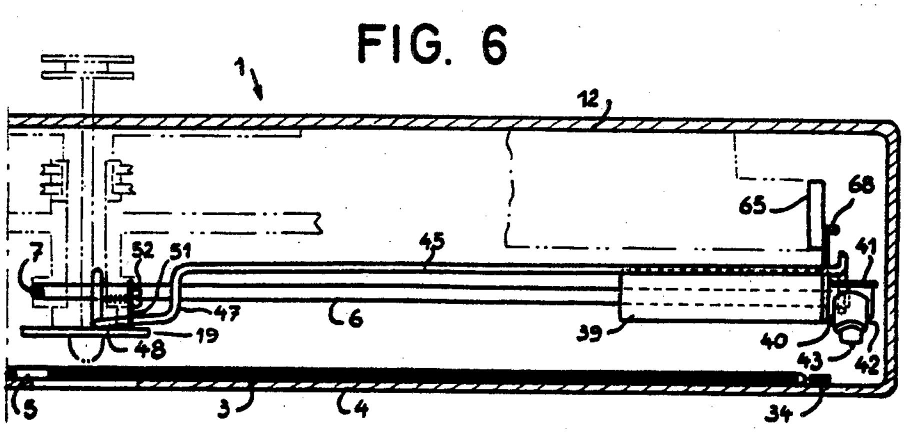
FIG. 6 is a vertical section on the line VI—VI in FIG. 5.

At its top edge the lug 40 has a tongue 44 resting on a wire 45 having an arm disposed parallel to the phonograph guide 6 (FIG. 6).

At its outer end said wire is bent at right angles (reference 46) and winds around the arm 6 while at the other end the arm 45 initially bends down at 47 (FIG. 6) and then forms a bend 48 bearing on the plate 19 and terminating in an arm 49 (FIG. 5) perpendicular to the arm on which it is wound (at 50—FIG. 5).

A spring 51 secured at 52 on the plate 9 holds the bend 48 in contact with the plate 19. A spring 53 holds the nose 44 in contact with the wire 45 (FIG. 8).

Figure 7:
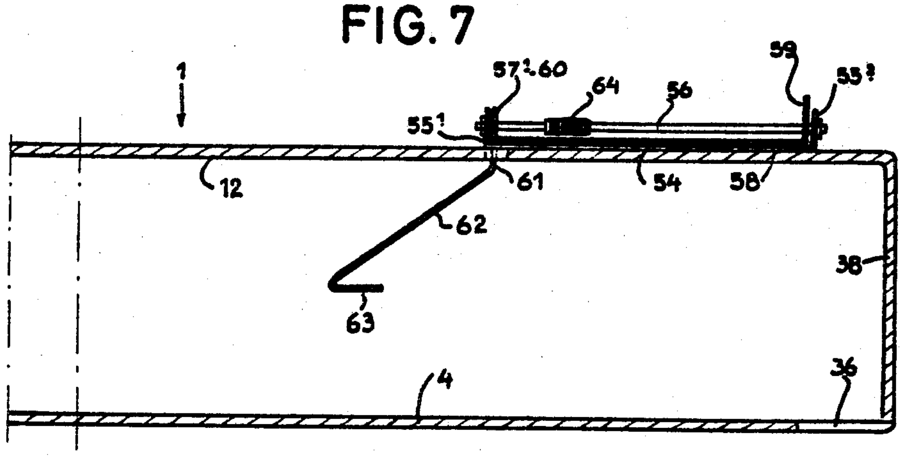
FIG. 7 is a vertical section on the line VII—VII in FIG. 4.
Figure 14:
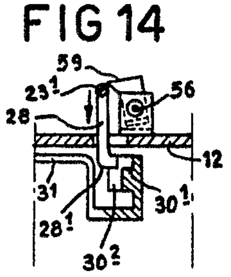
Figure 15:
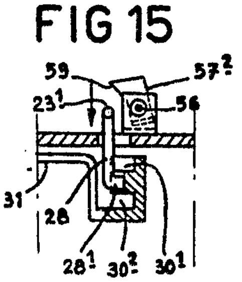
Figure 16:
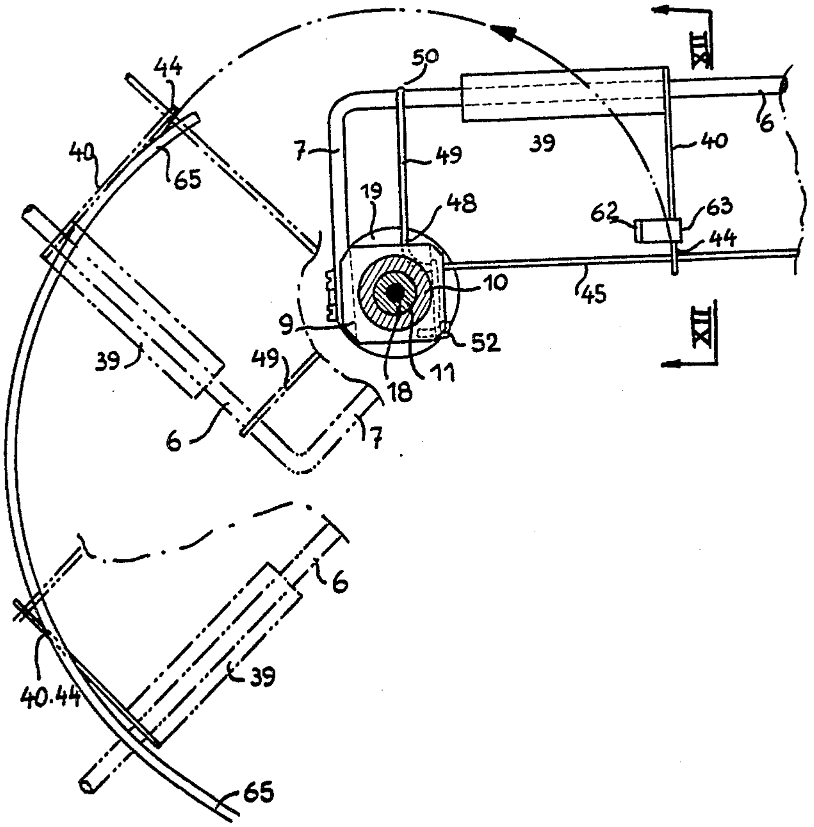

At the top part 12 of casing 1 beside and parallel to the lever $\mathbf{23^1}$ is a U-support 54 bent up at its ends $\mathbf{55^1}$–$\mathbf{55^2}$ (FIG. 7); these bent ends have a spindle 56 passing through them, said spindle also passing through bends $57^1$–$57^2$ forming part of a strip 58 situated just above 54. Bend $57^2$ (FIGS. 14 and 15) has a nose 59 which in the playing position touches the lever $23^1$ (FIG. 14).

Figure 12:
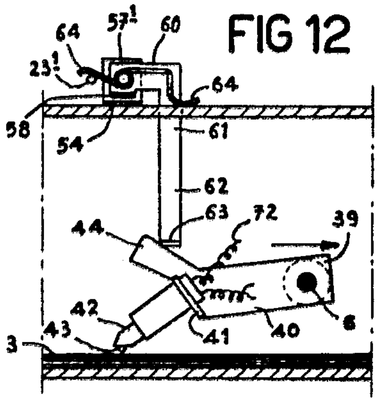

Bend $57^1$ extends laterally (at 60) and then has an arm 61 which initially drops perpendicularly to the top wall 12 and then, after extending through the wall, bends at 62 to terminate in a horizontal part 63 (FIG. 12).

A spring 64 is wound on spindle 56 while another end bears on the top wall 12 of casing 1.

Figure 2:
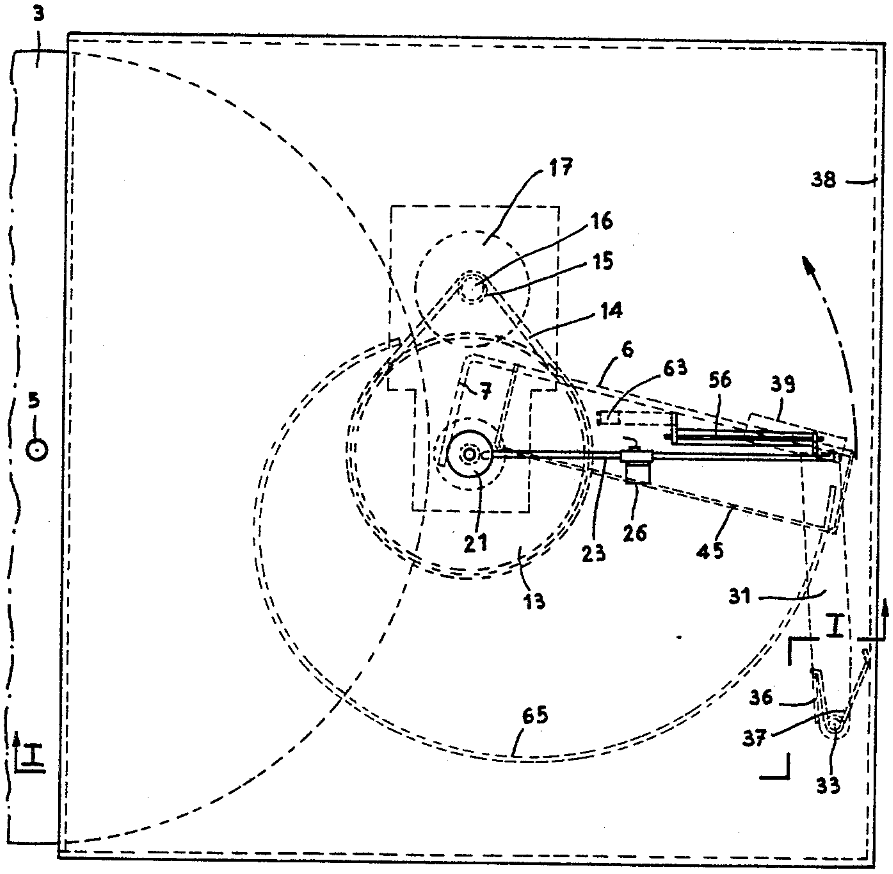
FIG. 2 is a plan view of the record player.

An important feature is the presence of a spiral 65 formed by a flat member disposed edgewise with respect to the top wall 12 and on said wall (FIG. 2).

At the end of spiral 65 is disposed a contact 66 which in the record playing position supports a projection 67 borne by a flexible tongue 68 to which is connected a lead 69 connecting the tongue 68 and the motor 17, while another lead 70 connects contact 66 to the current supply.

Figure 17:
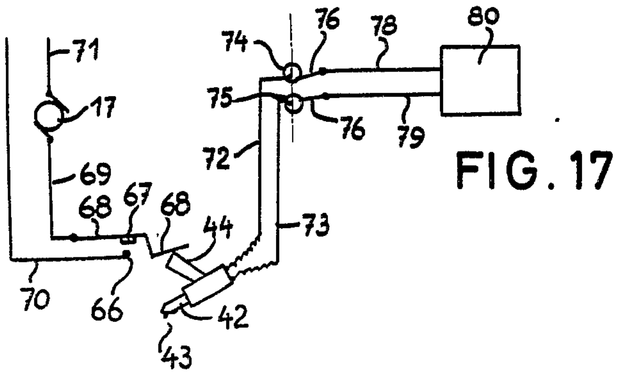
FIG. 17 is a circuit diagram.

Electric motor 17 is connected to the current supply by a lead 71 (FIG. 17).

From pick-up 42 two leads 72–73 extend to rings 74–75 which are electrically insulated and are disposed on the sleeve 10 so as to rotate therewith and transmit the record-playing current to sliding contacts 76–77 connected by leads 78–79 to an amplifier 80.

The record 3 for playing is introduced via slot 2 (FIG. 1) and abuts the bend 35 in the arm 34 of lever 32 and if pushing is continued the lever 32 pivots about the pivot 33, the arm 31 being driven so that the inclined surface 30 on said arm 31 acts on the slightly curved end $28^1$ (FIG. 10) of lever $23^1$ which, as it slides on the inclined surface 30, causes lever 23–$23^1$ to pivot about pivot 24; the bend $28^1$ thus engages a notch $30^1$ (FIGS. 10 and 11) provided at the top of the inclined surface 30 and immediately next to the same; a slot $30^2$ communicates with the base of this groove and will be discussed hereinafter (FIG. 14).

Figure 10:
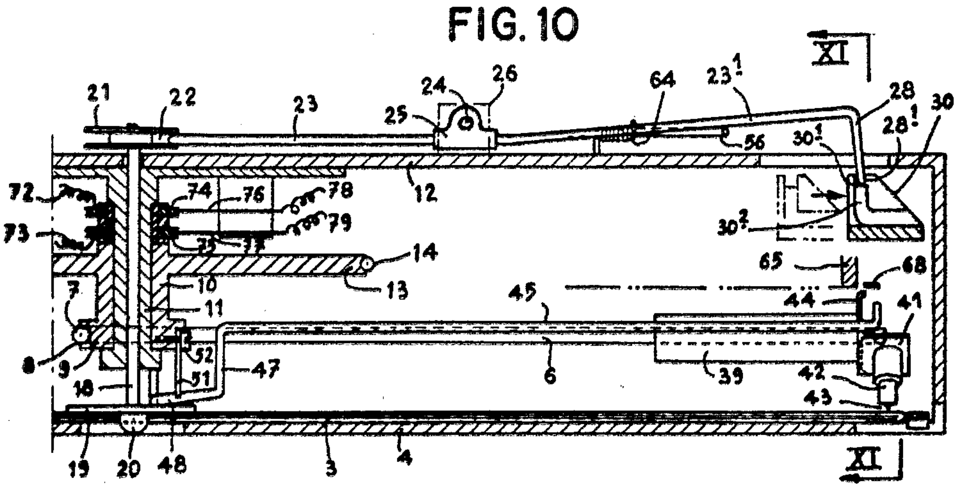
FIG. 10 is a partial vertical section showing the player at the beginning of playback.
Figure 11:
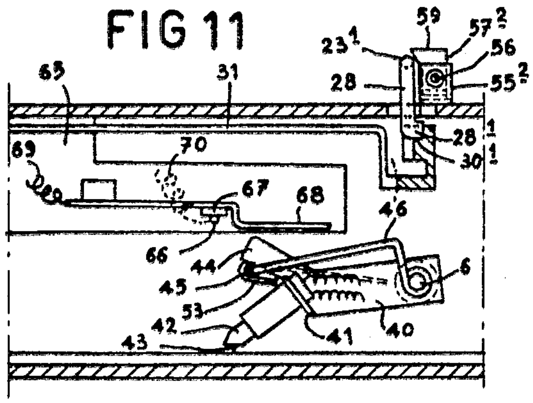
FIG. 11 is a vertical section on the line XI—XI in FIG. 10, FIGS. 12 to 16 are explanatory views relating to operation just before the end of playback.

Pivoting of lever 23–$23^1$ results in downward sliding of the assembly of elements 21–18–19–20 and hence stud 20 is introduced into the hole 5 of record 3 which is thus centered and locked vertically (FIG. 10).

As it descends, plate 19 drives the assembly of elements 49–48–45–46 which turns slightly around the arm 6 so that the sleeve 39, lug 40, edge 41 and the tongue 44 with the pick-up holder 42 are lowered and the stylus 43 comes into contact with the record.

Since the tongue 68 is no longer raised it drops and the projection 67 touches the fixed contact 66 thus closing the circuit of motor 17 which is started and pulley 13 is rotated and drives the arm 6 bearing the playback equipment.

During playing of the record, the stylus 43 follows the groove of the record and thus approaches the center, the pick-up sleeve 39 sliding along the guide 6.

Figure 13:
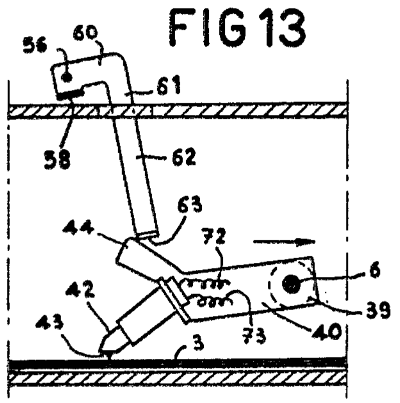

When the needle reaches the end groove, the tongue 44 abuts the horizontal part 63 of the element 62 of the assembly of elements 61–60–$57^1$–58–$57^2$–59 (FIG. 12) so that this assembly pivots about the spindle 56 (FIG. 13); the nose 59 which normally touches part $23^1$ of lever 23–$23^1$ (FIG. 11) pushes this part to the left (FIG. 14) and the edge $28^1$ which was in the notch $30^1$ is released from the latter and drops in the slot $30^2$ (FIG. 15); lever 23–$23^1$ pivots about pivot 24 and the assembly of elements 22–21–18–19–20 is moved upwards so that the pickup is raised and the stud 20 is released from the hole 5 in the record 3 and the latter is released.

As it rises, plates 19 drives upwards the bend 48 of wire 45 and the strip 44 which rested on this wire is initially driven upwards and the same acts on to the assembly of elements 40–41–42 bearing the stylus 43.

The stylus 43 is therefore no longer in contact with the record.

At that time the arm 6 continues to turn and the tongue 44 which was lifted meets the outer part of the spiral 65 and slides along said spiral until tongue 44 acts on the flexible strip 68 at the end of the spiral so as separate the projection 67 from the contact 66 so that the supply current to the motor is broken (FIGS. 8 and 17) and the motor and the pick-up stop.

At the same time lever 32 is released and by the action of the spring 37 it moves away from the wall 38 and pushes the record 3 by the end 35 of the arm 34 to partially eject the record 3 from the slot 2.

What I claim is:

1. A record player comprising means for supporting a record in a stationary centered position during playing, a guide supported for rotation about an axis coextensive with the center of the record, a pick-up engageable in the grooves of the record and mounted for free slidable movement on said guide to travel therealong radially of the record by engagement in the record grooves and rotation of said guide, a casing having a slot through which the record to be played is introduced, a lever positioned at the end of the introduction movement of the record into the slot to control centering and support of the record, means for holding the pick-up in an inoperative position and means coupled to the lever for releasing the pick-up to enable the same to contact the record for a playing operation.

2. A record player according to claim 1 comprising a release mechanism at the end of the playing of the record for acting on the pick-up to raise the pick-up, release the record and push the record from the casing.

3. A record player according to claim 2 comprising a fixed spiral secured to the casing and positioned relative to the pick-up to engage the same when the pick-up is in raised position at the end of the playing of the record and return the pick-up to the position corresponding to the beginning of play of the record for subsequent playing.

4. A record player according to claim 3 comprising a switch at the end of the spiral which opens the motor circuit when the pick-up acts thereon in the raised position and which corresponds substantially to the position of the first groove of the start of the record.

5. A record player comprising means for supporting a record in a stationary centered position during playing, a guide supported for rotation about an axis coextensive with the center of the record, a pick-up engageable in the grooves of the record and mounted for free slidable movement on said guide to travel therealong radially of the record by engagement in the record grooves and rotation of said guide, a fixed shaft rotatably supporting said guide, a spindle slidable within the shaft and including a record centering stud at the bottom thereof and means at the top thereof for axially displacing the spindle to selectively insert the stud into the centered record or remove the stud from the record after it has been played, and a sleeve slidably and pivotably mounted on said guide and bearing said pick-up, said guide comprising a rod having a bend portion, a sleeve rotatably mounted on said shaft and including a portion engaging said bend portion of the rod whereby said rod rotates with said sleeve, and a motor drivingly connected to said sleeve.

6. A record player according to claim 5 comprising rings on the sleeve mounted on said shaft to rotate therewith, lead wires extending from said pick-up to said rings and further leads connected to said rings and to an amplifier.

7. A record player comprising means for supporting a record in a stationary centered position during playing, a guide supported for rotation about an axis coextensive with the center of the record, a pick-up engageable in the grooves of the record and mounted for free slidable movement on said guide to travel therealong radially of the record by engagement in the record grooves and rotation of said guide, a fixed shaft rotatably supporting said guide, a spindle slidable within the shaft and including a record centering stud at the bottom thereof and means at the top thereof for axially displacing the spindle to selectively insert the stud into the centered record or remove the stud from the record after it has been played, and a sleeve slidably and pivotably mounted on said guide and bearing said pick-up, said means at the top of said spindle comprising a grooved pulley, a lever pivotable about a fixed point having one end engaging said pulley and an opposite bent end forming an arm, and a pivotable release lever having an inclined surface for engaging said arm of said lever.

8. A record player according to claim 7 wherein said release lever includes a top arm and a bottom arm, the latter having a terminal bend portion adapted to engage a notch provided in the base of the casing, a strut between the top and bottom arms and a spring engaging said strut so as to hold the release lever away from the wall of the casing.

9. A record player according to claim 7 comprising a U-support at the top of the casing in parallel relationship to the lever which is pivotable about said fixed point, said U-support being bent upwards at its ends, a spindle extending through said bent ends of the U-support and also through bends forming part of a band situated just above the U-support, one of said bends having a nose which in the playing position contacts said lever which is pivotable about said fixed point.

10. A record player according to claim 9 wherein the other of said bends extends laterally and includes an arm which depends perpendicularly at first to the top wall of the casing and then bends to terminate in a horizontal part.

11. A record player according to claim 9 wherein said release lever is pivoted by the action of the record and said inclined surface of said release lever acts on said lever which is pivotable about a fixed point to cause the bent end of the latter said lever to engage a notch which is provided in said inclined surface.

12. A record player according to claim 11 wherein when the stylus reaches the end groove of the record, said tongue causes said nose to act on said lever which is pivotable about a fixed point such that the bent end of the latter lever which was in said notch is released therefrom and drops in a slot in said inclined surface while said latter lever is pivoted and the centering stud is disengaged from the record.

13. A record player comprising means for supporting a record in a stationary centered position during playing, a guide supported for rotation about an axis coextensive with the center of the record, a pick-up engageable in the grooves of the record and mounted for free slidable movement on said guide to travel therealong radially of the record by engagement in the record grooves and rotation of said guide, a fixed shaft rotatably supporting said guide, a spindle slidable within the shaft and including a record centering stud at the bottom thereof and means at the top thereof for axially displacing the spindle to selectively insert the stud into the centered record or remove the stud from the record after it has been played, and a sleeve slidably and pivotably mounted on said guide and bearing said pick-up, said sleeve which bears the pick-up having an outer end with a lug formed thereon with a bend to which the pick-up is secured, said lug having an outer edge bearing a tongue, a wire supporting said tongue and having an arm parallel to said guide and a bent outer end which is wound around the pick-up while at the other end the arm has a downwardly bent portion with an extension having a bend bearing against said spindle and a portion extending perpendicular to the downwardly bent portion.

14. A record player according to claim 13 comprising a plate on said spindle bearing said centering stud such that with said spindle lowered, said wire turns slightly around said guide so that the pick-up is lowered and the stylus thereof comes into contact with the record.

References Cited

UNITED STATES PATENTS

| | | | |
|---|---|---|---|
| 1,251,918 | 1/1918 | Pratley | 274—9 |
| 1,178,840 | 4/1916 | Cassard | 274—9 |
| 3,181,870 | 5/1965 | Lasswell | 274—9 |
| 2,915,315 | 12/1959 | Rabinow | 274—13 |

LEONARD FORMAN, Primary Examiner

F. J. AMBROSIO, Assistant Examiner

U.S. Cl. X.R.

274—9.2, 13, 23, 39.1